United States Patent [19]

Poehlman

[11] Patent Number: 4,835,965
[45] Date of Patent: Jun. 6, 1989

[54] "Y" EQUAL LENGTH EXHAUST SYSTEM FOR TWO-CYCLE ENGINES

[75] Inventor: Arthur G. Poehlman, West Bend, Wis.

[73] Assignee: Outboard Marine Corporation, Waukegan, Ill.

[21] Appl. No.: 53,112

[22] Filed: May 21, 1987

[51] Int. Cl.⁴ .............................................. F02B 27/02
[52] U.S. Cl. ...................................................... 60/313
[58] Field of Search .......................................... 60/313

[56]  References Cited
U.S. PATENT DOCUMENTS

| | | |
|---|---|---|
| 2,306,580 | 12/1942 | Wilson . |
| 3,064,417 | 11/1962 | Tryhorn ................... 60/312 |
| 3,453,824 | 7/1969 | Biesecker . |
| 3,516,247 | 6/1970 | Knox . |
| 3,605,940 | 9/1971 | Christensen . |
| 3,692,006 | 9/1972 | Miller et al. . |
| 3,695,238 | 10/1972 | Boerma . |
| 3,875,744 | 4/1975 | Brooks et al. . |
| 3,882,681 | 5/1975 | Schmidt . |
| 4,022,019 | 5/1977 | Garcea ................... 60/323 |
| 4,186,819 | 2/1980 | Nowak et al. . |
| 4,197,704 | 4/1980 | Date et al. . |
| 4,660,378 | 4/1987 | Scharpf ................... 60/313 |

FOREIGN PATENT DOCUMENTS

| | | |
|---|---|---|
| 760421 | 5/1953 | Fed. Rep. of Germany . |
| 966932 | 9/1957 | Fed. Rep. of Germany . |
| 886556 | 10/1943 | France . |
| 505515 | 12/1954 | Italy . |

Primary Examiner—Douglas Hart
Attorney, Agent, or Firm—Michael, Best & Friedrich

[57]  ABSTRACT

Disclosed herein is an exhaust system for a two-cycle internal combustion engine including a rotatable crankshaft, first and second cylinders firing 180° apart, and first and second exhaust ports communicating with the first and second cylinders respectively, the exhaust system comprising a substantially Y-shaped hollow exhaust pipe having first, second and third branches each having an open end and each being substantially equal in length to the distance an acoustical wave will travel through the exhaust pipe during an interval over which the crankshaft rotates through substantially ten to twenty degrees of rotation at a predetermined engine speed, the open ends of the first and second branches being adapted to be coupled to the exhaust ports of the first and second cylinders respectively.

34 Claims, 3 Drawing Sheets

"Y" EQUAL LENGTH EXHAUST SYSTEM FOR TWO-CYCLE ENGINES

BACKGROUND OF THE INVENTION

This invention relates generally to tuned exhaust systems for two-cycle internal combustion engines and in particular to tuned exhaust systems in which exhaust pulses are reflected and propagated so as to provide desirable pressures at the engine exhaust ports and thereby improve engine efficiency.

It is known to improve the power and brake specific fuel consumption of a two-cycle internal combustion engine, having an even number of cylinders, through use of a tuned exhaust system operable to reduce exhaust port pressure during the scavenging portion of each cylinder's power stroke and to increase exhaust port pressure immediately following transfer port closure during each cylinder's compression stroke. Although effective, tuned exhaust systems for two-cycle engines have been relatively expensive and complex in construction. Additionally, such known tuned exhaust systems are typically tuned to a single engine speed and thus do not function to provide improved engine performance at both midrange and high engine speeds.

Tuned exhaust systems for two-cycle engines are shown, for example, in the following U.S. Pat. Nos.:

| Nowak, et al. | 4,186,819 | Feb. 5, 1980 |
| Brooks, et al. | 3,875,744 | Apr. 8, 1975 |
| Boerma | 3,695,238 | Oct. 3, 1972 |
| Miller, et al. | 3,692,006 | Sept. 19, 1972 |

Attention is also directed to the following U.S. and foreign patent documents:

| Date et al. | 4,197,704 | Apr. 15, 1980 |
| Schmidt | 3,882,681 | May 13, 1975 |
| Christensen | 3,605,940 | Sept 20, 1971 |
| Knox, Jr. | 3,516,247 | June 23, 1970 |
| Biesecker | 3,453,824 | July 8, 1969 |
| Wilson | 2,306,580 | Dec. 29, 1942 |
| (France) | 886,556 | Oct. 19, 1943 |
| (Italy) | 505,515 | Dec. 17, 1954 |
| (Germany) | 996,932 | Sept 19, 1957 |
| (Germany) | 760,421 | May 4, 1953 |

SUMMARY OF THE INVENTION

The invention provides an exhaust system for a two-cycle internal combustion engine including a rotatable crankshaft, first and second cylinders firing 180° apart, and first and second exhaust ports communicating with the first and second cylinders respectively, the exhaust system comprising a substantially Y-shaped hollow exhaust pipe having first, second and third branches each having an open end and each being substantially equal in length to the distance and acoustical wave will travel through the exhaust pipe during an interval over which the crankshaft rotates through substantially ten to twenty degrees of rotation at a predetermined engine speed, the open ends of the first and second branches being adapted to be coupled to the exhaust port of the first and second cylinders respectively.

In one embodiment, the first, second and third branches are each substantially equal in length to the length an exhaust accoustical wave will travel through the exhaust pipe during the interval in which the crankshaft rotates through substantially twelve to fifteen degrees of rotation at the predetermined engine speed.

In one embodiment, the open end of the third branch terminates in a chamber opening to the atmosphere, and the volume of the chamber is such that exhaust pulses exiting into the chamber are substantially damped and are not reflected back into the exhaust system from the walls of the chamber.

In one embodiment, each of the first, second and third branches is formed of a rigid metal and the first, second and third branches are commonly joined to one another by means of welding or are formed by a casting or number of castings.

In one embodiment, the predetermined engine speed is substantially 8,000 rpm and the length of each of the first, second and third branches is substantially 6.4 to 7.5 inches.

In one embodiment, the predetermined engine speed is 6,000 rpm and the length of each of the first, second and third branches is substantially 8.5 to 10 inches.

In one embodiment, the predetermined engine speed is substantially 5000 rpm and the length of each of the frist, second and third branches is substantially 10.2 to 12 inches.

The invention also provides an exhaust system for a two-cycle internal combustion engine having a crankshaft, first and second cylinders firing substantially 180° apart, and first and second exhaust ports communicating with the first and second cylinders respectively, the exhaust system comprising a first exhaust pipe of predetermined length having one end adapted to communicate with the first exhaust port and having a remaining end, a second exhaust pipe substantially equal in length to the first exhaust pipe and having one end adapted to communicate with the second exhaust port the second exhaust pipe further including a remaining end communicating with the remaining end of the first exhaust pipe, and a third exhaust pipe substantially equal in length to the first and second exhaust pipes, the third exhaust pipe having one end communicating with the remaining ends of the first and second exhaust pipes and having a remaining end opening to the atmosphere substantially without constriction.

The invention also provides an exhaust system for a two-cycle internal combustion engine having a crankshaft, a first pair of cylinders firing substantially 180° apart, a second pair of cylinders firing substantially 180° apart, and a plurality of exhaust ports individually communicating with individual ones of the cylinders in the first and second cylinder pairs, the exhaust system comprising a first substantially Y-shaped hollow exhaust pipe having first, second and third branches which are of substantially equal predetermined length and have open ends, the open ends of the first and second branches being adapted to be coupled to the exhaust ports of the individual cylinders of the first cylinder pair, a second substantially Y-shaped hollow exhaust pipe having first, second and third branches which are of substantially equal predetermined length and have open ends, the open ends of the first and second branches of the second Y-shaped exhaust pipe being adapted to be coupled to the exhaust ports of the individual cylinders of the second cylinder pair, and means for communicating the open end of the third branch of the Y-shaped exhaust pipe with the open end of the third branch of the second Y-shaped exhaust pipe.

The invention also provides an exhaust system for a two-cycle internal combustion engine having a cylinder, a piston mounted for reciprocation within the cylinder, a transfer port opening and closing in response to reciprocation of the piston within the cylinder, and an exhaust port opening before and closing after the transfer port in response to reciprocation of the piston within the cylinder, the exhaust system comprising an exhaust pipe including first, second and third branches of substantially equal predetermined length, the first branch having an open end adapted to receive from the exhaust port of the cylinder an acoustical exhaust pulse in response to opening of the exhaust port and having a second end, the second branch including one end communicating with the second end of the first branch and having an other end including means for positively reflecting from the other end acoustical exhaust pulses propagating through the second branch to the other end, the third branch including one end communicating with the second end of the first branch and having another end including means for negatively reflecting from the other end of the third branch acoustical exhaust pulses propagating through the third branch to the other end of the third branch, the second and third branches thereby being operable to repetitively return to the open end of the first branch first, second, third and fourth simultaneously arriving acoustical exhaust pulses reflected respectively from the other ends of the second and third branches in response to each opening of the exhaust port, and the predetermined length being such that the first, second and third repetitive simultaneous arrivals of the reflected acoustical exhaust pulses at the open end of the first branch occur before the transfer port closes and such that the fourth simultaneous arrival of the reflected acoustical exhaust pulses at the open end of the first branch substantially occurs after the transfer port closes and before the exhaust port closes.

The invention also provides a method of operating a two-cycle internal combustion engine having a cylinder, a piston mounted for reciprocation within the cylinder, a transfer port opening and closing in response to reciprocation of the piston within the cylinder, and an exhaust port opening before and closing after the transfer port in response to reciprocation of the piston within the cylinder, the method comprising the steps of providing an exhaust pipe including first, second and third double-ended branches of substantially equal predetermined length commonly communicating with one another at one end and each including a second end, applying an acoustical exhaust pulse to the second end of the first branch, positively reflecting from the second end of the second branch acoustical exhaust pulses propagating through the second branch to the second end of the second branch, negatively reflecting from the second end of the third branch acoustical exhaust pulses propagating through the third branch to the other end of the third branch such that the second and third branches repetitively return to the second end of the first branch first, second, third and fourth simultaneously arriving acoustical exhaust pulses reflected respectively from the second ends of the second and third branches in response to each opening of the exhaust port, and selecting the predetermined length such that the first, second and third repetitive simultaneous arrival of the reflected acoustical exhaust pulses at the second end of the first branch occur before the transfer port closes and such that the fourth simultaneous arrival of the reflected acoustical exhaust pulses at the second end of the first branch substantially occurs after the transfer port closes and before the exhaust port closes.

In one embodiment, the open ends of the third branches of the first and second Y-shaped exhaust pipe communicate with one end of a hollow tailpipe having a length substantially equal to twice the predetermined length and having a remaining end opening to the atmosphere.

In one embodiment, the cross-sectional shape and area of the tailpipe between the entrance and the exit are substantially uniform.

In one embodiment, the cross-sectional area of the tailpipe is substantially greater between the entrance and the exit than at the entrance or exit.

In one embodiment, the remaining ends of the third branches of the first and second Y-shaped exhaust pipes communicate with one end of a tailpipe having a length substantially shorter than the predetermined length.

In one embodiment, the remaining end of the tailpipe terminates in a chamber opening to the atmosphere, and the volume of the chamber is such that exhaust pulses exhausted through the chamber are substantially damped.

Various other features of the invention will become apparent to those skilled in the art upon review of the following detailed description, claims, and drawings.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for purposes of description and should not be regarded as limiting.

DESCRIPTION OF THE PREFERRED EMBODIMENT

Figure 1:
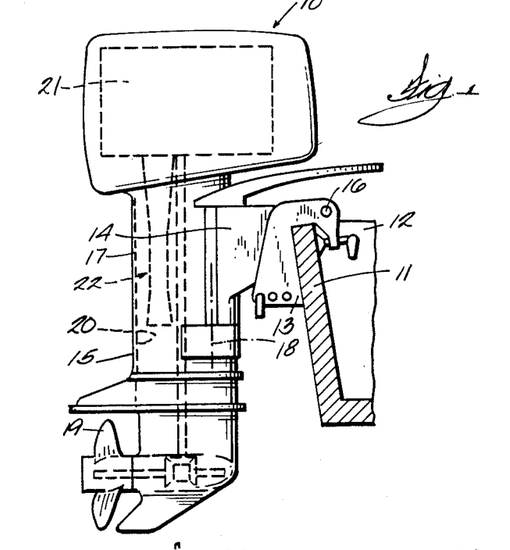
FIG. 1 is a side elevational view of a marine propulsion device which includes a two-cylinder, two-cycle engine having an exhaust system embodying various of the features of the invention.

A marine propulsion device 10 embodying the invention is illustrated in FIG. 1. The marine propulsion device 10 is fixedly attached to the transom 11 of a boat 12 by means of a mounting assembly including a transom bracket 13 fixedly attached to the transom 11, and a swivel bracket 14 mounted on the transom bracket 13 for pivotal movement relative to the transom bracket 13 about a generally horizontal tilt axis 16.

The marine propulsion device 10 also comprises a propulsion unit 17 mounted on the swivel bracket 14 for pivotal movement relative to the swivel bracket 14 about a generally vertical steering axis 18. The propulsion unit 17 includes a lower unit 15 having a hollow interior 20 and a rotatably mounted propeller 19, and further includes a two-cylinder, two-cycle internal combustion engine 21 mounted on the lower unit and drivingly connected to the propeller 19. The marine propulsion device 10, in turn, includes a "Y" equal length exhaust system 22 which embodies various of the features of the invention and which is connected to the internal combustion engine 21.

Figure 2:
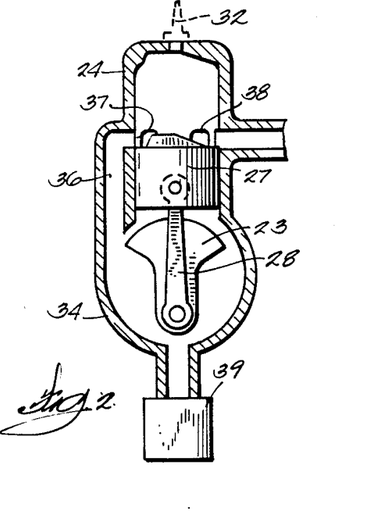
FIG. 2 is a cross-sectional view of the engine shown in FIG. 1.
Figure 3:
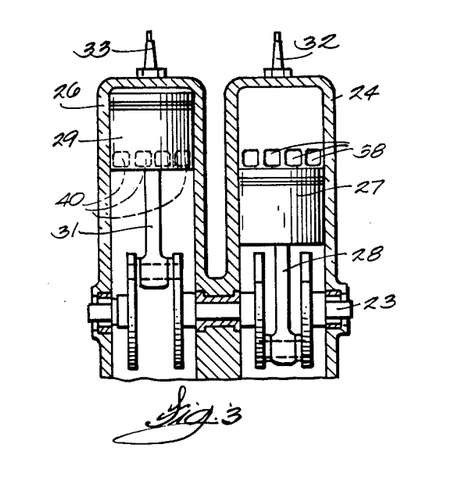
FIG. 3 is another cross-sectional view of the engine shown in FIG. 1

Referring to FIGS. 2 and 3, the two-cycle internal combustion engine 21 includes a rotatable crankshaft 23 and a pair of cylinders 24 and 26. A piston 27 is reciprocably disposed within cylinder 24 and is coupled to the crankshaft 23 by means of a connecting rod 28. Similarly, another piston 29 is reciprocably disposed within cylinder 26 and is coupled to the rotatable crankshaft 23 by means of an additional connecting rod 31. Spark plugs 32 and 33 are mounted to cylinders 24 and 26, respectively, and function to fire cylinders 24 and 26 when pistons 27 and 29 are at or near top dead center (TDC).

As best seen in FIG. 3, the internal combustion engine 21 is configured so that cylinders 24 and 26 fire substantially 180° apart during each rotation of the crankshaft 23. Accordingly, cylinders 24 and 26 alternately fire during successive 180° rotations of the crankshaft 23.

In accordance with conventional practice, the two-cycle internal combustion engine 21 includes a crankcase 34, and cylinder 24 includes a transfer passage 36 communicating at one end with the interior of the crankcase 34 and opening, at the other end, to the interior of the cylinder through a transfer port 37. The transfer port 37 is located such that the transfer passage 36 communicates with the interior of cylinder 24 when the piston 27 is at or near bottom dead center (BDC).

Cylinder 24 further includes one or more exhaust ports 38. Each of the exhaust ports 38 opens into the interior of the cylinder 24 through the sidewall thereof and is positioned so as to be open during the time the piston 27 is at or near bottom dead center. Typcally, the exhaust ports 38 are arranged to open when the piston reaches 95° to 98° after top dead center although it will be appreciated that other exhaust port timings may be appropriate. Preferably, each of the exhaust ports 38 extends somewhat above the transfer port 37 so that the exhaust ports open before the transfer port 37 during downward travel of the piston 27 and close after the transfer port during upward movement of the piston.

During operation of the two-cycle internal combustion engine 21, upward travel of piston 27 within cylinder 24 causes air to be drawn into the engine crankcase 34 through a carburetor 39 (shown schematically) wherein a fuel/oil mixture is atomized and mixed with the air to form a combustible fuel/oil/air mixture. During downward travel of the piston 27, the combustible mixture is compressed, and, when the transfer port 37 is uncovered by the piston, the increased pressure within the crankcase 34 forces the combustible mixture through the transfer passageway 36 into the combustion chamber of the cylinder 24.

Following compression of the combustible mixture during continued rotation of the crankshaft 23 and upward movement of the piston 27, an additional charge of the combustible mixture is drawn into the crankcase 34. During downward movement of the piston 27, the exhaust gases generated during combustion of the previously ignited charge are exhausted from the cylinder 24 through the exhaust ports 38 when the exhaust ports are uncovered as the piston 27 approaches bottom dead center.

Cylinder 26 is substantially similar or identical to cylinder 24 in construction and operation, and also includes (FIG. 4) a transfer passage 30, a transfer port 35 and one or more exhaust ports 40.

Both engine power output and brake specific fuel consumption can be improved by reducing pressure at the exhaust ports 38 and 40 shortly after the pistons 27 and 28 reach bottom dead center and by increasing pressure at the exhaust ports 38 and 40 shortly after closure of the transfer ports 37 and 35 and before closure of the exhaust ports 38 and 40 during each reciprocation of the pistons 27 and 29 within the cylinders 24 and 26 respectively. By reducing exhaust port pressure as the transfer ports 37 and 35 open, scavenging of exhaust gases from the cylinders is significantly improved. Similarly, by increasing exhaust port pressure shortly after transfer port closure, the pressure of the fresh fuel/oil/air mixture charge within the cylinder is increased, resulting in a "supercharging" effect. Both the improved scavenging and the "supercharging" effect contribute to improved engine performance. The desired changes in pressure at the exhaust ports 38 and 40 of the cylinders 24 and 26 respectively are developed by the exhaust system 22.

Figure 4:
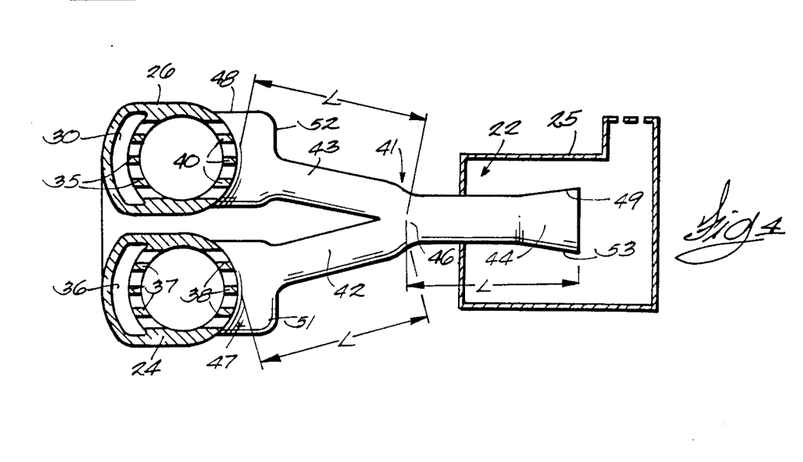
FIG. 4 is a diagrammatic view, partially in section, of a two-cylinder, two-cycle engine having an exhaust system which embodies various of the features of the invention.

The exhaust system 22, as illustrated in FIG. 4, is particularly adapted for a two cylinder, alternately firing, two-cycle engine and comprises a generally Y-shaped hollow member or exhaust pipe 41 having three open-ended branches 42, 43 and 44, of substantially equal length L. Preferably, the Y-shaped member or exhaust pipe 41 is formed of a heat-resistant, rigid, durable material, such as metal, and the branches 42, 43 and 44, are welded, integrally cast, or otherwise connected to one another at a common junction 46 such that the interiors of each branch communicate with one another. Opposite the common junction 46, each of the branches 42, 43 and 44, terminates in an open end 47, 48 and 49 respectively.

The open ends of branches 42 and 43 are adapted to be coupled, respectively, to the exhaust ports 38 and 40 of the first and second cylinders 24 and 26. To this end, an enlarged portion 51 and 52 is formed adjacent the open ends 47 and 48, respectively, of branches 42 and 43. Each of the enlarged portions 51 and 52 is dimensioned and shaped so as to completely cover the associated one of the exhaust ports 38 and 40 and to engage the internal combustion engine 21 in gas-tight relationship to cylinders 24 and 26. Preferably, the branches 42 and 43, together with the enlarged portions 51 and 52, are dimensioned such that the average distance between the exhaust ports 38 and 40 and the center of the common junction 46 is substantially equal to the predetermined length L. It will be appreciated that, in some engines, a portion of each of the branches 42 and 43 will be formed by the engine cylinder block itself. In such engines, the length of any portion of the branches 42 and 43 not formed by the engine cylinder block will be selected so that the average distance between the exhaust ports and the center of the common junction 46 is substantially equal to the predetermined length L.

To achieve the desired appropriately timed pressure variations at the exhaust ports 38 and 40 of the cylinders 24 and 26, the predetermined length L is preferably substantially equal to the distance that an exhaust acoustical or compressive wave, such as an exhaust gas pressure wave or impulse, will travel in the Y-shaped exhaust pipe 41 during the interval in which the rotatable crankshaft 23 rotates through fifteen degrees of rotation at a predetermined engine speed for which maximum efficiency is desired. Although fifteen degrees is the theoretical ideal, in practice, the predetermined length can be substantially equal to the distance such a wave will travel in the exhaust pipe 41 while the crankshaft rotates through anywhere from ten to twenty degrees of rotation.

To further improve engine operation, the open end 49 of branch 44 is completely free of constriction and preferably terminates in a flared section or megaphone 53 which improves the efficiency of the open end of the pipe in negatively or oppositely reflecting exhaust pulses reaching the open end (i.e. returning a reflected pulse having a sign or sense opposite the sign or sense of the exhaust pulse exiting the exhaust pipe). To muffle objectionable exhaust noise while avoiding the positive reflection of exhaust pulses back into the exhaust pipe 41, the megaphone 53 preferably opens into a chamber 25 (shown schematically in FIG. 4) communicating with the atmosphere and having sufficient volume to assure that such exhaust pulses are not substantially reflected from the walls of the chamber back into the exhaust pipe 41. In the example illustrated in FIG. 1, such a chamber comprises the interior 20 of the lower unit 15 of the propulsion unit 17. Preferably, the cross-sectional area of the chamber exceeds the maximum cross-sectional area of the megaphone 53 by at least four times. The megaphone 53 also has the effect of increasing the pulse width of the return pulses it helps develop which is desirable in that the durations of the desired variations in exhaust port pressure are lengthened.

Figure 9:
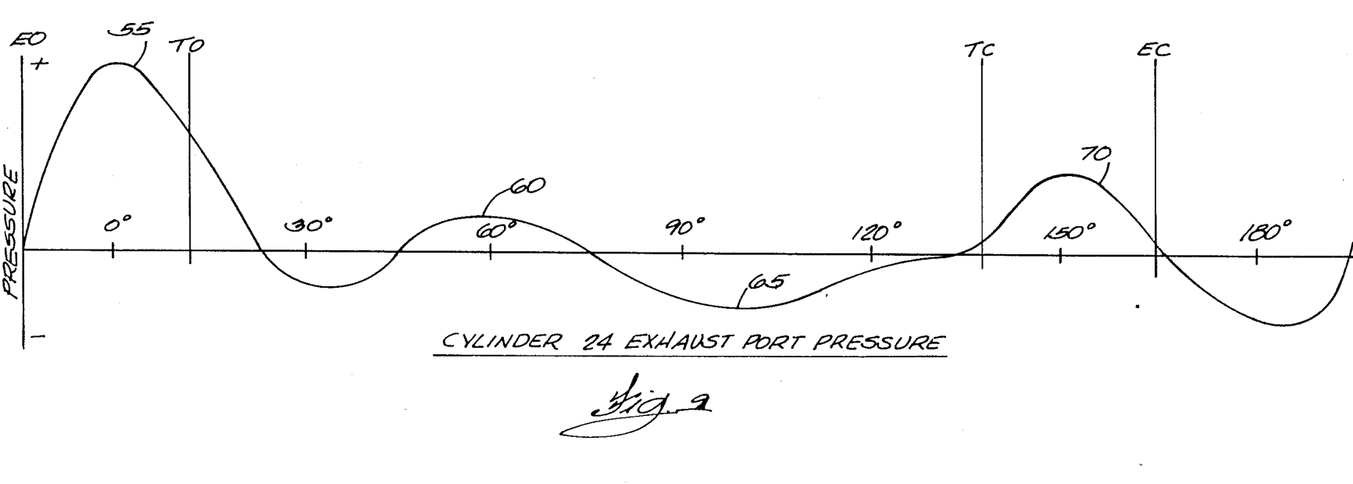
FIG. 9 is a graphical representation of exhaust port pressure versus time for one cylinder of the two-cylinder, two-cycle engine shown in Figures 5(a) through 5(g), useful in understanding the operation of the exhaust system therein illustrated.

The operation of the Y-shaped exhaust system 22 can best be understood by reference to figures 5(a) through 5(g) in conjunction with the exhaust port pressure history graph of FIG. 9. In these figures, positive or compressive exhaust pulses are indicated by a double positive sign, "++", while negative or rarefactive pressure pulses are indicated by a double negative sign "– –". Furthermore, each of the successive views in FIG. 5 is separated from the immediately preceding view by substantially 30° of crankshaft rotation. Accordingly, the engine crankshaft rotates through substantially 180° between FIG. 5(a) and FIG. 5(g). Finally, in the discussion which follows, exhaust gas pressure waves which are positively reflected (i.e. no sign reversal upon reflection) from closed exhaust ports of cylinders 24 or 26 are referred to as "reflected" waves or pulses, while negatively reflected (i.e. sign reversal upon reflection) pressure waves returned from the open end 49 of exhaust pipe branch 41 are referred to as "return" waves or pulses.

Figure 5A:
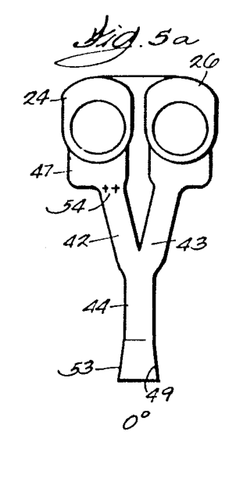
FIGS. 5(a) through 5(g) are diagrammatic views, similar to FIG. 4, of a two-cylinder, two-cycle engine having an exhaust system embodying various of the features of the invention, useful in understanding the operation thereof.

In FIG. 5(a), the exhaust ports 40 of cylinder 26 are closed and the exhaust ports 38 of cylinder 24 have just opened (EO, FIG. 9). Consequently, an accoustical compressive exhaust pulse 54 is present at the upper end 47 of exhaust pipe branch 42. The compressive exhaust pulse gives rise to an increase 55 in the exhaust port pressure at cylinder 24 as shown in FIG. 9.

Figure 5B:
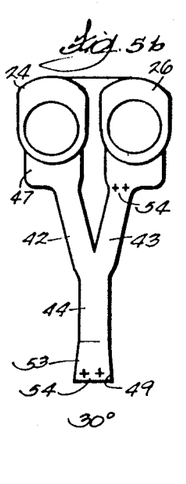

In FIG. 5(b), the exhaust ports of cylinder 26 remain closed, and the crankshaft has rotated through substantially 30° of rotation. Exhaust port pressure at cylinder 24 decreases as illustrated in FIG. 9. Because the length of each branch of the Y-shaped exhaust pipe 41 is substantially equal to the length the exhaust pulse will travel during 15° of crankshaft rotation, at the end of 30° of rotation, the compressive exhaust pulse 54 has propagated through branch 44 to the open end 49, and through branch 43 to the closed exhaust ports of cylinder 26. In addition, the transfer port 37 of cylinder 24 has opened between FIGS. 5(a) and 5(b) (to FIG. 9).

Figure 5C:
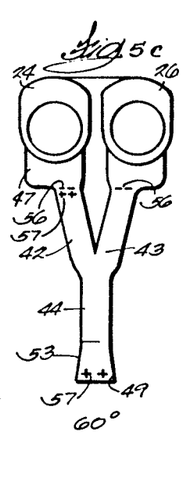

In FIG. 5(c), the exhaust ports of cylinder 26 remain closed and the crankshaft has rotated an additional 30°. Because branch 44 of the exhaust pipe 41 terminates in an open end 49, a rarefactive return pulse 56 is developed in response to exhaust pulse 54 reaching the open end 49 and, in FIG. 5(c), propagates through branches 44, 42, and 43 to the exhaust ports of cylinders 24 and 26. Additionally, the closed exhaust ports of cylinder 26 have reflected the exhaust pulse 54 to generate a compressive reflective pulse 57 which propagates, in FIG. 5(c), from cylinder 26, through branches 43, 42 and 44, to the first cylinder 24 and the open end 49 of branch 44. Because, in practice, it has been found that compressive waves reflect more efficiently than rarefactive waves, the magnitude of the compressive reflective pulse 57 is greater than that of the rarefactive return pulse 56, and a pressure increase 60 is recorded at the exhaust ports of cylinder 24 as shown in FIG. 9. Between FIGS. 5(c) and 5(d) the piston 27 within cylinder 24 reaches bottom dead center.

Figure 5D:
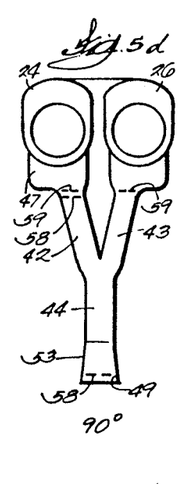

In FIG. 5(d), after an additional 30° of crankshaft rotation, the rarefactive return pulse 56, present at the still closed exhaust ports of cylinder 26 in FIG. 5(c), is reflected and thus results in the development of another rarefactive reflective exhaust pulse 58 at cylinder 24 and at the open end 49 of branch 44. Similarly, the compressive exhaust pulse 57, present at the open end 49 of branch 44 in FIG. 5(c), develops an additional rarefactive return pulse 59 which, in FIG. 5(d), has propagated to cylinders 24 and 26. Accordingly, in FIG. 5(d) the simultaneous presence of the rarefactive reflective pulse 58 in combination with the rarefactive return pulse 59 reduces the pressure at the still-open exhaust ports of cylinder 24 with the further effect that scavenging of exhaust gases from the cylinder 24 is substantially improved. This is shown in FIG. 9 as a reduction 65 in exhaust port pressure at cylinder 24.

Figure 5E:
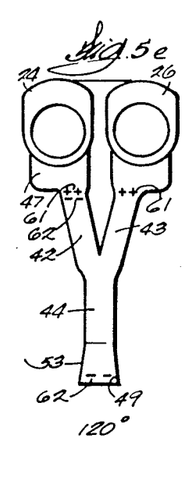

In FIG. 5(e), after an additional 30° of crankshaft rotation, the exhaust ports of cylinder 26 remain closed and the rarefactive reflective pulse 58, present at the open end 49 of branch 44 in Figure 5(d), results in the development of a compressive return pulse 61 which propagates through branches 44, 42 and 43 to the exhaust ports of cylinders 24 and 26. Similarly, the rarefactive return pulse 59, present at the exhaust ports of cylinder 26 in FIG. 5(d), reflects off the still-closed exhaust ports of cylinder 26 and thus results in a rarefactive reflective pulse 62 at the open end 49 of branch 44 and at the exhaust ports of cylinder 24. However, because of the increased pulse width provided by the megaphone 53, the reduction 65 (FIG. 9) in exhaust port pressure persists and accounts for a slightly reduced exhaust port pressure at 120° as shown in FIG. 9.

Figure 5F:
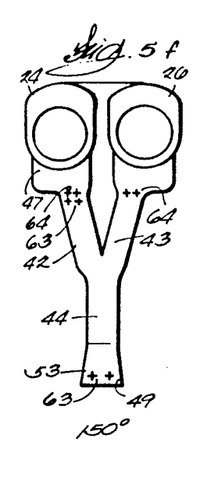

In FIG. 5(f) the crankshaft has rotated through an additional 30° and, between FIG. 5(e) and FIG. 5(f), the transfer port 37 (FIG. 2) of cylinder 24 has closed. The exhaust ports of cylinder 26 remain closed. The compressive return pulse 61, present at cylinder 26 in FIG. 5(e), reflects from cylinder 26 resulting in a compressive reflective pulse 63 at cylinder 24 and at the open end 49 of branch 44. Similarly, the rarefactive reflective pulse 62, present at the open end 49 in FIG. 5(e), results in the production of a compressive return pulse 64 which propagates through branch 44 and branches 42 and 43 to the cylinders 24 and 26 respectively. Thus, in FIG. 5(f), the compressive reflective pulse 63 and the compressive return pulse 64 are simultaneously present at the exhaust ports of cylinder 24. This, in turn, results in the desired increase 70 (FIG. 9) in pressure at the exhaust ports of cylinder 24 shortly after transfer port closure (TC FIG. 9), with the further effect that the pressure, and therefore the quantity of the combustible fuel/oil/air mixture, within cylinder 24 is increased. Shortly following the development of such increased pressure, the exhaust ports of cylinder 24 close (EC FIG. 9) as the piston 27 continues its compression stroke.

Figure 5G:
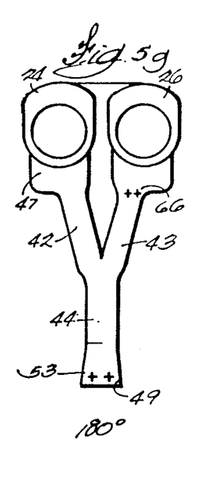

In FIG. 5(g), the piston 29 (FIG. 3) within cylinder 26 has completed its power stroke and the exhaust ports 40 of cylinder 26 have opened. This develops an accoustical compressive exhaust pulse 66 which is substantially identical to the previously described accoustical compressive exhaust pulse 54 developed by cylinder 24. The exhaust pulse 66 propagates and reflects back through the exhaust pipe 41 in substantially the same manner as previously described resulting in reduced exhaust port pressure adjacent cylinder 26 during scavenging and increased exhaust port pressure shortly after closure of the transfer port in cylinder 26. After an additional 180° of crankshaft rotation, the cycle begins anew with the development of another compressive exhaust pulse 54 at the exhaust ports of cylinder 24.

Figure 6:
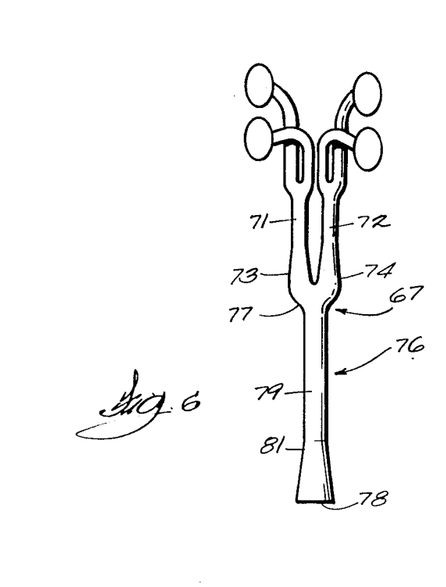
FIG. 6 is a diagrammatic view of a four-cylinder, two-cycle engine exhaust system which embodies various of the features of the invention.
Figure 7:
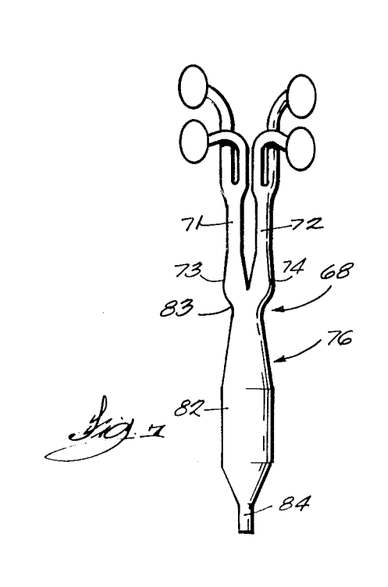
FIG. 7 is a diagrammatic view of another embodiment of a four-cylinder, two-cycle engine exhaust system which embodies various of the features of the invention.
Figure 8:
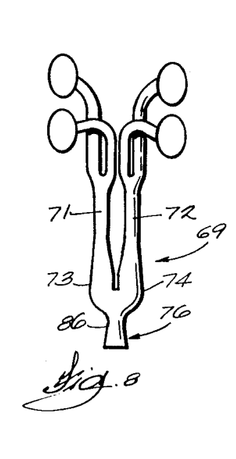
FIG. 8 is a diagrammatic view of still another embodiment of a four-cylinder, two-cycle engine exhaust system which embodies various of the features of the invention.

Three alternative embodiment exhaust systems, 67, 68 and 69, are illustrated in FIG. 6, 7 and 8 respectively. Each of these systems is constructed for use with a four-cylinder, two-cycle internal combustion engine (not shown) wherein the four cylinders are paired such that the cylinders within each pair fire substantially 180° apart.

In each of the illustrated alternative embodiments 67, 68 and 69, two Y-shaped exhaust pipes 71 and 72 are included and are arranged such that each exhaust pipe can be coupled to a pair of cylinders firing 180° apart. Each of the Y-shaped exhaust pipes 71 and 72 includes a trailing end 73 and 74, respectively, and can be substantially similar or identical in construction and operation to the Y-shaped exhaust pipe 41 shown and described in connection with FIGS. 4 and 5. Preferably, the length of each branch within each of the Y-shaped exhaust pipes 71 and 72 is calculated as was described with regard to the previously described exhaust pipe 41 and is selected so that engine efficiency is improved over the range of high or top end engine speeds, e.g., 5,000 rpm to 6,000 rpm.

To improve engine efficiency at midrange speeds of, for example, 2,500 rpm to 3,000 rpm, each of the exhaust systems 67, 68 and 69 includes means for communicating the open trailing ends 73 and 74 of the Y-shaped exhaust pipes 71 and 72 with each other and with the atmosphere. Preferably, the communicating means comprises an elongated tailpipe 76 having one end 77 commonly connected to the open ends 73 and 74 of the Y-shaped exhaust pipes 71 and 72, and having another end 78 opening to the atmosphere.

In each of the alternative embodiments 67, 68 and 69, the tailpipe 76 can be configured so as to improve engine efficiency at either high or midrange speeds. Alternatively, the tailpipe 76 can be configured so as to have a neutral, i.e., uniform, effect on engine efficiency over the entire range of engine speeds.

Engine efficiency at midrange engine speeds can be improved using the configuration illustrated in FIG. 6. In this embodiment, the tailpipe 76 comprises an open pipe 79 terminating in a flared megaphone 81. The length of the open pipe 79, including the megaphone 81, is substantially equal to twice the length of the individual branches in the Y-shaped exhaust pipes 71 and 72. This forms a long "Y" system which will tune at half of the speed of the short "Y" systems represented by each of the Y-shaped exhaust pipes 71 and 72.

High speed efficiency can be increased using the configuration illustrated in FIG. 7. In this embodiment, the tailpipe 76 comprises an elongate expansion chamber 82 also having a length substantially equal to twice the length of the individual branches in the Y-shaped exhaust pipes 71 and 72. However, expansion chamber 82 differs from the open pipe 79 in that the expansion chamber 82 is not of uniform diametric cross-sectional area over its entire length but, rather, is tapered such that the cross-sectional area of the chamber is substantially greatest between its ends 83 and 84. Furthermore, the expansion chamber is tapered so as to substantially reduce the cross-sectional area adjacent the open trailing end 84 such that positive exhaust pulses are returned from the trailing end 84 during engine operation. This improves high-speed engine efficiency by reflecting each cylinder's blowdown pulse back to the same cylinder immediately following transfer port closure.

A neutral system, i.e., one having a uniform effect on engine efficiency over the entire range of engine speeds, is illustrated in FIG. 8. In this configuration, the tailpipe 76 comprises a flared megaphone section 86 having a length substantially shorter than the individual branches of the Y-shaped exhaust pipes 71 and 72. The megaphone 86 is designed only to increase exhaust gas flow through the exhaust system beyond the junction of the two Y-shaped exhaust pipes 71 and 72 and preferably avoids the development of any return pulses, whether compressive or rarefactive, back through the exhaust pipes 71 and 72. Thus, the megaphone 86 will neither increase nor decrease engine efficiency at any particular speed.

By appropriately selecting and adjusting the lengths of the branches in each of the Y-shaped exhaust pipes 41, 71 and 72 herein shown and described, engine efficiency at any predetermined engine speed can be significantly improved. Assuming transfer port closure 150° after cylinder blowdown, and assuming an accoustic velocity of between 1,700 and 2,000 feet per second through the exhaust pipe, the optimum length L of the branches in the Y-shaped members 41, 71 and 72 is 6.4 to 7.5 inches, 8.5 to 10 inches, and 10.2 to 12 inches for 8,000 rpm, 6,000 rpm, and 5,000 rpm respectively. For an engine having 44 cubic inch displacement, a chamber, such as the interior 20 of the lower unit 15 of the propulstion unit 17 (FIG. 1) having a volume of 180 cubic inches should be sufficient to dampen the exhaust pulses and prevent the return of unwanted positively reflected pulses. Although the optimum length L for each branch is substantially equal to the distance the exhaust pulse travels in 15° of crankshaft rotation at the tuned speed, it may be desirable, in practice, to shorten the optimum length by approximately 1° for each 5° the exhaust ports open past 90° after top dead center in order to assure proper timing of the desired exhaust port pressure increases and decreases.

Various other features and advantages of the invention are set forth in the following claims.

I claim:

1. A two-cycle internal combustion engine operable at a given speed and including a rotatable crankshaft, first and second cylinders firing 180° apart, and first and second exhaust ports communicating with said first and second cylinders respectively, a substantially Y-shaped hollow exhaust pipe having first, second and third branches each having an open end and each being substantially equal in length to the distance an exhaust acoustical wave will travel through said exhaust pipe during an interval in which said crankshaft rotates through substantially ten to twenty degrees of rotation at the given engine speed, said open ends of said first and second branches being coupled to said exhaust ports of said first and second cylinders respectively.

2. An engine according to claim 1 wherein each of said first, second and third branches is substantially equal in length to the distance an exhaust accoustical wave will travel through said exhaust pipe during an interval in which the crankshaft rotates through substantially twelve to fifteen degrees of rotation at the predetermined engine speed.

3. An engine according to claim 1 wherein said open end of said third branch terminates in a chamber having sufficient volume such that exhaust pulses exiting into said chamber are substantially damped and are not substantially reflected back into said open end of said third branch from said chamber.

4. An engine according to claim 1 wherein said open end of said third branch is substantially free of constriction.

5. An engine according to claim 1 wherein each of said first, second and third branches is formed of a rigid metal and wherein said first, second and third branches are commonly joined to one another by means of welding.

6. An engine according to claim 1 wherein each of said first, second and third branches is formed of cast metal.

7. An engine according to claim 1 wherein the length of each of said first, second and third branches is substantially 6.4 to 7.5 inches whereby the predetermined engine speed is substantially 8,000 rpm.

8. An engine according to claim 1 wherein the length of each of said first, second and third branches is substantially 8.5 to 10 inches whereby the predetermined engine speed is 6,000 rpm.

9. An engine according to claim 1 wherein the length of each of said first, second and third branches is substantially 10.2 to 12 inches whereby the predetermined engine speed is substantially 5000 rpm.

10. A two-cycle internal combustion engine having a crankshaft, first and second cylinders firing substantially 180° apart, and first and second exhaust ports communicating with said first and second cylinders respectively, a first exhaust pipe of predetermined length having one end communicating with said first exhaust port and having a remaining end, a second exhaust pipe substantially equal in length to said first exhaust pipe and having one end communicating with said second exhaust port, said second exhaust pipe further including a remaining end communicating with said remaining end of said first exhaust pipe, and a third exhaust pipe substantially equal in length to said first and second exhaust pipes, said third exhaust pipe having one end communicating with said remaining ends of said first and second exhaust pipes and having an open remaining end substantially free of constriction.

11. An engine according to claim 10 wherein said remaining end of said third exhaust pipe terminates in a chamber having sufficient volume such that exhaust pulses exhausted into said chamber are substantially damped.

12. An engine according to claim 10 wherein each of said first, second and third exhaust pipes is formed of a rigid metal and wherein said first, second and third exhaust pipes are welded to one another.

13. An engine according to claim 10 wherein each of said first, second and third exhaust pipes is of cast metal construction.

14. An engine according to claim 10 wherein said predetermined length is substantially 6.4 to 7.5 inches.

15. An engine according to claim 10 wherein said predetermined length is substantially 8.5 to 10 inches.

16. An engine according to claim 10 wherein said predetermined length is substantially 10.2 to 12 inches.

17. A two-cycle internal combustion engine having a crankshaft, a first pair of cylinders firing substantially 180° apart and including respective first and second exhaust ports, a second pair of cylinders firing substantially 180° apart and including respective first and second exhaust ports, a first substantially Y-shaped hollow exhaust pipe having first, second and third branches which are of substantially equal predetermined length and have open ends, said open ends of said first and second branches being respectively coupled to said first and second exhaust ports of said cylinders of said first cylinder pair, a second substantially Y-shaped hollow exhaust pipe having first, second and third branches which are of substantially equal predetermined length and have open ends, said open ends of said first and second branches of said second Y-shaped exhaust pipe being coupled to said first and second exhaust ports of said cylinders of said second cylinder pair, and means for communicating said open end of said third branch of said first Y-shaped exhaust pipe with said open end of said third branch of said second Y-shaped exhaust pipe.

18. An engine according to claim 17 wherein said communicating means comprises an elongated tailpipe having an entrance at one end communicating with said open ends of said third branches of said first and second Y-shaped exhaust pipes and having an exit opposite said entrance and communicating with the atmosphere.

19. An engine according to claim 18 wherein said tailpipe has a length substantially equal to twice said predetermined length.

20. An engine according to claim 19 wherein said tailpipe includes a chamber and wherein the cross-sectional shape and area of said chamber between said entrance and said exit are substantially uniform.

21. An engine according to claim 19 wherein the cross-sectional area of said tailpipe is substantially greater between said entrance and said exit than at said entrance or said exit.

22. An engine according to claim 18 wherein said tailpipe has a length substantially shorter than said predetermined length.

23. An engine according to claim 22 wherein said exit of said tailpipe terminates in a megaphone opening to the atmosphere.

24. A two-cycle internal combustion engine having a cylinder, a piston mounted for reciprocation within said cylinder, a transfer port opening and closing in response to reciprocation of said piston within said cylinder, and an exhaust port opening before and closing after said transfer port in response to reciprocation of said piston within said cylinder, an exhaust pipe including first, second and third branches of substantially equal predetermined lenght, said first branch having an open end receiving from said exhaust port of said cylinder an acoustical exhaust pulse in response to opening of said exhaust port and having a second end, said second branch including one end communicating with said second end of said first branch and having an other end including means for positively reflecting from said other end acoustical exhaust pulses propagating through said second branch to said other end, said third branch including one end communicating with said second end of said first branch and having an other end including means for negatively reflecting from said other end of said third branch acoustical exhaust pulses propagating through said third branch to said other end of said third branch, each of said second and third branches being operable, in response to each opening of said exhaust port, to successively return to said open end of said first branch respective first, second, third, and fourth acoustical exhaust pulses which are respectively reflected from said other ends of said second and third branches and which arrive substantially simultaneously at said open end of said first branch, and said predetermined length being such that the first, second, and third simultaneous arrivals of said reflected acoustical exhaust pulses at said open end of said first branch occur before said transfer port closes and such that the fourth simultaneous arrival of said reflected acoustical exhaust pulses at said open end of said first branch substantially occurs after said transfer port closes and before said exhaust port closes.

25. An engine in accordance with claim 24 wherein the internal combustion chamber includes a rotatable crankshaft and said predetermined length is substantially equal to the distance an acoustical exhaust pulse will propagate through said exhaust pipe during the interval in which the rotatable crankshaft rotates through substantially 10 to 20 degrees of rotation.

26. An engine in accordance with claim 24 wherein the internal combustion engine includes a second cylinder having an exhaust port and wherein said means for positively reflecting comprises the closed exhaust port of the second cylinder.

27. An engine in accordance with claim 24 wherein said means for negatively reflecting comprises a flared megaphone communicating with said other end of said third branch.

28. A method of operating a two-cycle internal combustion engine having a cylinder, a piston mounted for reciprocation within the cylinder, a transfer port opening and closing in response to reciprocation of the piston within the cylinder, and an exhaust port opening before and closing after the transfer port in response to reciprocation of the piston within the cylinder, said method comprising the steps of providing an exhaust pipe including first, second and third double-ended branches of substantially equal predetermined length commonly communicating with one another at one end and each including a second end, applying an acoustical exhaust pulse to said second end of said first branch, positively reflecting from said second end of said second branch acoustical exhaust pulses propagating through said second branch to said second end of said second branch, and negatively reflecting from said second end of said third branch acoustical exhaust pulses propagating through said third branch to said other end of said third branch such that each of said second and third branches operates, in response to each opening of the exhaust port, to successively return to said second end of said first branch respective first, second, third and fourth acoustical exhaust pulses which are reflected from said second ends of said second and third branches, and which arrive substantially simultaeously at the exhaust port such that the first, second, and third simultaneous arrivals of said reflected acoustical exhaust pulses at said second end of said first branch occur before the transfer port closes and such that the fourth simultaneous arrival of said reflected acoustical exhaust pulses at said second end and said first branch substantially occurs after the transfer port closes and before the exhaust port closes.

29. A two-cycle internal combustion engine having a cylinder, a piston mounted for reciprocation within said cylinder, a transfer port opening and closing in response to reciprocation of said piston within said cylinder, and an exhaust port opening before and closing after said transfer port in response to reciprocation of said piston within said cylinder, an exhaust pipe including first, second and third branches of substantially equal predetermined length, said first branch having an open end receiving from said exhaust port of said cylinder an acoustical exhaust pulse in response to opening of said exhaust port and having a second end, said second branch including one end communicating with said second end of said first branch and having an other end which is continuously closed to positively reflect from said other end acoustical exhaust pulses propagating through said second branch to said other end, and said third branch including one end communicating with said second end of said first branch and having an other end including means for negatively reflecting from said other end of said third branch acoustical exhaust pulses propagating through said third branch to said other end of said third branch.

30. A metohd of operating a two-cycle internal combustion engine having a cylinder, a piston mounted for reciprocation within the cylinder, a transfer port opening and closing in response to reciprocation of the piston within the cylinder, and an exhaust port opening before and closing after the transfer port in response to reciprocation of the piston within the cylinder, said method comprising the steps of providing an exhaust pipe including first, second and third double-ended branches of substantially equal predetermined length commonly communicating with one another at one end and each including a second end, which second end of said second branch is continuously closed, applying an acoustical exhaust pulse to said second end of said first branch, positively reflecting from said continuously closed second end of said second branch acoustical exhaust pulses propagating through said second branch to said second end of said second branch, and negatively reflecting from said second end of said third branch acoustical exhaust pulses propagating through said third branch to said other end of said third branch.

31. A two-cycle internal combustion engine having a cylinder a rotatable crankshaft, a piston mounted for reciprocation within said cylinder, a transfer port opening and closing in response to reciprocation of said piston within said cylinder, and an exhaust port opening before and closing after said transfer port in response to reciprocation of said piston within said cylinder, an exhaust pipe including first, second and third branches of substantially equal predetermined length substantially equal to the distance an exhaust acoustical wave will travel through said exhaust pipe during an interval in which said crankshaft rotates sustantially through ten to twenty degrees of rotation, said first branch having an open end receiving from said exhaust port of said cylinder an acoustical exhaust pulse in response to opening of said exhaust port and having a second end, said second branch including one end communicating with said second end of said first branch and having an other end including means for positively reflecting from said other end acoustical exhaust pulses propagating through said second branch to said other end, and said third branch including one end communicating with said second end of said first branch and having an other end including means for negatively reflecting from said other end of said third branch acoustical exhaust pulses propagating through said third branch to said other end of said third branch.

32. A method of operating a two-cycle internal combustion engine having a cylinder, a rotatably crankshaft, a piston mounted for reciprocation within the cylinder and operably connected to the crank shaft, a transfer port opening and closing in response to reciprocation of the piston within the cylinder, and an exhaust port opening before and closing after the transfer port in response to reciprocation of the piston within the cylinder, said method comprising the steps of providing an exhaust pipe including first, second and third double-ended branches of substantially equal predetermined length commonly communicating with one another at one end and each including a second end, which predetermined length is equal to the distance an exhaust acoustical wave will travel through the exhaust pipe during an interval in which the crankshaft rotates substantially through ten to twenty degrees of rotation, applying an acoustical exhaust pulse to said second end of said first branch, positively reflecting from said second end of said second branch acoustical exhaust pulses propagating through said second branch to said second end of said second branch, and negatively reflecting from said second end of said third branch acoustical exhaust pulses propagating through said third branch to said other end of said third branch.

33. A two-cycle internal combustion engine in accordance with claim 10 wherein said predetermined length is equal to the distance an exhaust acoustical wave will travel through said exhaust pipe during an interval in which said crankshaft rotates substantially through ten to twenty degrees of rotation.

34. A two-cycle internal combustion engine in accordance with claim 17 wherein said predetermined lengths of said first and second exhaust pipes are substantially equal to the distance an exhaust acoustical wave will travel through said first and second exhaust pipes during an interval in which said crankshaft rotates substantially through ten to twenty degrees of rotation.

* * * * *